Aug. 27, 1929.   P. T. SCHUBERT   1,726,241
HACK SAW BLADE HOLDER
Filed July 5, 1928
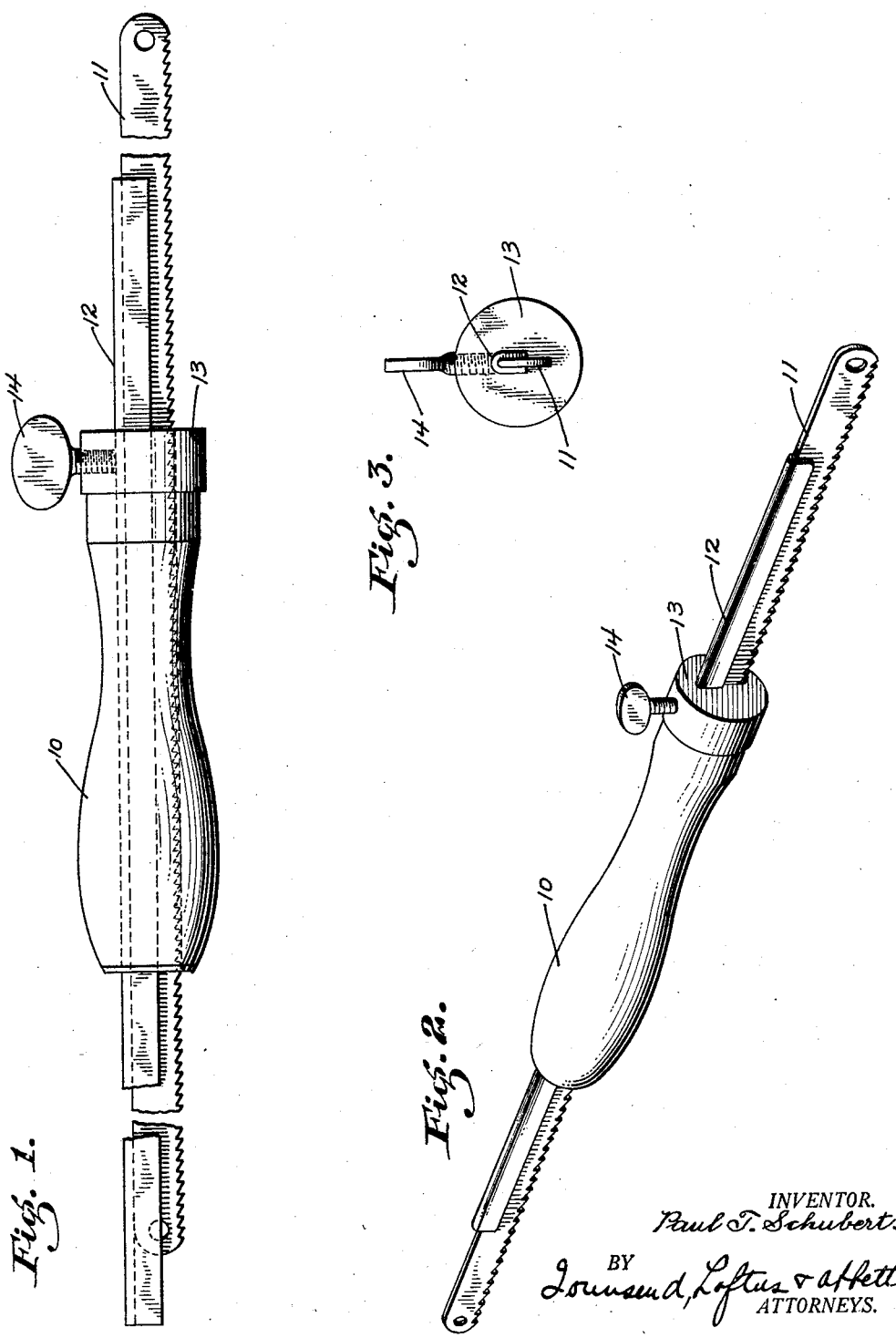
INVENTOR.
Paul T. Schubert.
BY
Townsend, Loftus & Affett
ATTORNEYS.

Patented Aug. 27, 1929.

1,726,241

UNITED STATES PATENT OFFICE.

PAUL THEODORE SCHUBERT, OF MILL VALLEY, CALIFORNIA.

HACK-SAW-BLADE HOLDER.

Application filed July 5, 1928. Serial No. 290,504.

My present invention relates to saws and more particularly to a holder for hack-saw blades and serviceable pieces of the same.

An object of my invention is to provide a handle for hack-saw blades and the like which is adapted to hold the blade in a serviceable manner so that it may be conveniently used in sawing circular and irregular holes.

Another object of my invention is to provide a handle for hack-saw blades together with a stiffening means so that the blade may be extended to any desired length and at the same time be held straight and rigid.

A further object of my invention is to provide in combination with a hack-saw blade a stiffening member which may be moved with respect to the saw blade to provide a stiffening throughout different lengths thereof and a handle adapted to be clamped upon said saw blade and stiffening member to form a grip whereby the saw may be conveniently used.

With the foregoing and other objects in view the invention consists in the arrangement and combination of parts hereinafter described and claimed and, while the invention is not restricted to the exact details of construction disclosed herein, still for purpose of illustrating a practical embodiment thereof reference is had to the accompanying drawings in which like reference characters designate the same parts in the several views, and in which—

Figure 1 is a side elevation of my improved handle and stiffening member showing a saw blade in position, Figure 2 is a perspective view of the handle shown in Figure 1, and Figure 3 is an end view of the device shown in Figure 1.

Referring now more particularly to the drawings, it will be noted that my improved device comprises a handle member 10 having an opening extending axially thereof and through which a hack-saw blade 11 and a stiffening member 12 are adapted to project. The handle 10 is also provided with a metallic ferrule 13 into which a thumb screw 14 is threaded for the purpose of providing a clamping means suitable for securing the blade 11 and the stiffening member 12 within the handle where desired. The hole through the handle member 10 is of a cross section which conforms to the outline of the stiffening member 12 and blade 11, as will be seen in Figures 2 and 3, and the ferrule 13 projects over the end of the handle and outlines this opening so that the saw teeth will engage the same and prevent damage to the handle 10 which is of wood or other similar material. The stiffening member 12 is shown as a strip of metal bent so as to form an inverted U when viewed from the end thereof so that the saw blade 11 can slide freely therein.

From the above it will be seen that I have produced a novel device which will constitute a valuable and handy adjunct to a mechanic's kit of tools and one which will be particularly useful to locksmiths and cabinet makers in cutting lock openings and the like.

Various devices have been proposed for holding hack-saw blades but so far as the applicant is aware he is the first to produce a holder for a blade wherein the blade may be extended to any length beyond the handle so that it can be used without having supporting means extending therealong which will interfere with its free use in cutting small and irregular openings.

While I have shown the preferred form of my invention as now known to me, it is to be understood that various changes may be made in its construction without departing from the spirit of the invention as defined in the appended claims.

Having thus described my invention, what I claim and desire to secure by Letters Patent is—

1. A flexible saw blade holder comprising a rigid back member adapted to form a stiffening means for the saw blade, a handle through which said back member and blade may extend, and means for securing said blade and back member within said handle against displacement, said means permitting said handle, said holder and said blade to be secured in different relative positions with respect to each other.

2. A grip for hack-saw blades and the like comprising a handle having an opening extending axially therethrough for the reception of the blade, a U-shaped stiffening member adapted to engage the back of the blade and forming a stiffening means therefor, and means for securing said blade and said stiffening member in different positions with respect to each other within said handle.

PAUL THEODORE SCHUBERT.